US010656617B2

(12) United States Patent
Pfeffer et al.

(10) Patent No.: US 10,656,617 B2
(45) Date of Patent: May 19, 2020

(54) MEASUREMENT DEVICE FOR MACHINING CENTER

(71) Applicant: FARO Technologies, Inc., Lake Mary, FL (US)

(72) Inventors: Charles Pfeffer, Avondale, PA (US); Markus Grau, Korntal-Muenchingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 874 days.

(21) Appl. No.: 14/946,008

(22) Filed: Nov. 19, 2015

(65) Prior Publication Data

US 2016/0077515 A1    Mar. 17, 2016
US 2017/0199508 A9    Jul. 13, 2017

Related U.S. Application Data

(63) Continuation-in-part of application No. PCT/US2015/033883, filed on Jun. 3, 2015, and a
(Continued)

(51) Int. Cl.
*G05B 19/402* (2006.01)
*G01C 11/02* (2006.01)
(Continued)

(52) U.S. Cl.
CPC ........... *G05B 19/402* (2013.01); *B23Q 3/155* (2013.01); *B23Q 17/249* (2013.01);
(Continued)

(58) Field of Classification Search
CPC .............. B23Q 17/2471; B23Q 17/249; B23Q 2230/002; B23Q 3/155; G01B 11/2513;
(Continued)

(56) References Cited

U.S. PATENT DOCUMENTS 4,885,836 A    12/1989    Bonomi et al.
5,189,624 A *   2/1993    Barlow ................ G05B 19/182
                                                            700/169
(Continued)

FOREIGN PATENT DOCUMENTS

JP    11104936 A    4/1999
JP    5283563    *  9/2013    ............. B23Q 17/20
(Continued)

OTHER PUBLICATIONS

Renishaw, Innovative laser tool setting technology provides accuracy, flexibility and robust operation, Jul. 17, 2003, Renishaw, p. 4.

*Primary Examiner* — Kenneth M Lo
*Assistant Examiner* — Mohammad A Rahman
(74) *Attorney, Agent, or Firm* — Cantor Colburn LLP

(57) ABSTRACT

A computer numerical control (CNC) machining center is provided. The CNC machining center includes a spindle that receives a cutting tool. A work surface is operably arranged adjacent the spindle. A non-contact three-dimensional (3D) measurement device is operably coupled to the tool mount, the 3D measurement device including a projector and at least one device camera, the at least one camera being arranged to receive light from the light source that is reflected off of a surface. A plurality of targets is provided with at least one of the targets coupled to the 3D measurement device. At least two photogrammetry cameras are provided having a orientation and a field of view to acquire images of the targets. A controller is coupled for communication to the 3D measurement device and the at least two cameras, the controller determining the position of the 3D measurement device within the machining center during operation.

20 Claims, 6 Drawing Sheets

Related U.S. Application Data continuation-in-part of application No. 14/728,014, filed on Jun. 2, 2015, now abandoned.

(60) Provisional application No. 62/085,746, filed on Dec. 1, 2014, provisional application No. 62/025,205, filed on Jul. 16, 2014.

(51) Int. Cl.
*B23Q 17/24* (2006.01)
*B23Q 3/155* (2006.01)
*G01B 11/25* (2006.01)

(52) U.S. Cl.
CPC ...... *B23Q 17/2471* (2013.01); *G01B 11/2513* (2013.01); *G01B 11/2545* (2013.01); *G01C 11/02* (2013.01); *B23Q 2230/002* (2013.01); *G01B 2210/58* (2013.01); *G05B 2219/37115* (2013.01); *Y10T 483/17* (2015.01)

(58) Field of Classification Search
CPC ................................................ G01B 11/2545; G01B 2210/58; G01C 11/02; G05B 19/402; G05B 2219/37115; Y10T 483/17
See application file for complete search history.

(56) References Cited

U.S. PATENT DOCUMENTS

| | | | |
|---|---|---|---|
| 5,538,373 A | 7/1996 | Kirkham | |
| 5,650,852 A | 7/1997 | Chastain et al. | |
| D410,477 S | 6/1999 | Nihei et al. | |
| 6,020,571 A | 2/2000 | Grossklaus | |
| 6,166,811 A | 12/2000 | Long et al. | |
| 6,269,284 B1 | 7/2001 | Lau et al. | |
| 6,285,959 B1 | 9/2001 | Greer | |
| 6,442,419 B1 | 8/2002 | Chu et al. | |
| 6,965,843 B2 | 11/2005 | Raab et al. | |
| 7,423,734 B1 | 9/2008 | Luik | |
| 7,548,305 B1* | 6/2009 | Pedreiro | G01B 11/24 356/2 |
| 8,127,458 B1 | 3/2012 | Ferrari | |
| 8,438,747 B2 | 5/2013 | Ferrari | |
| 8,832,954 B2 | 9/2014 | Atwell et al. | |
| 8,970,823 B2 | 3/2015 | Heidemann et al. | |
| 9,664,508 B2 | 5/2017 | McAfee et al. | |
| 2002/0002885 A1 | 1/2002 | Luik | |
| 2004/0090635 A1 | 5/2004 | Franz et al. | |
| 2006/0145703 A1* | 7/2006 | Steinbichler | G01B 11/002 324/512 |
| 2007/0177716 A1* | 8/2007 | Georgi | G05B 19/4086 378/210 |
| 2009/0080706 A1 | 3/2009 | Tao et al. | |
| 2009/0196463 A1* | 8/2009 | Kuniz | G06F 3/014 382/107 |
| 2009/0265946 A1 | 10/2009 | Jordil et al. | |
| 2010/0060718 A1* | 3/2010 | Forster | A61B 1/227 348/47 |
| 2013/0201326 A1* | 8/2013 | Tsujii | G01C 11/02 348/135 |
| 2014/0028805 A1 | 1/2014 | Tohme | |
| 2014/0268178 A1 | 9/2014 | Atwell et al. | |
| 2015/0015607 A1* | 1/2015 | Sodhi | G06F 3/016 345/633 |
| 2015/0073584 A1 | 3/2015 | Goodale et al. | |
| 2015/0265852 A1* | 9/2015 | Meir | G06T 7/285 600/1 |
| 2015/0285903 A1* | 10/2015 | Bridges | G01C 15/002 356/4.01 |
| 2016/0016274 A1 | 1/2016 | Grau | |

FOREIGN PATENT DOCUMENTS

| | | |
|---|---|---|
| JP | 5283563 B2 | 9/2013 |
| WO | 2013184340 A1 | 12/2013 |

\* cited by examiner

MEASUREMENT DEVICE FOR MACHINING CENTER

CROSS-REFERENCE TO RELATED APPLICATIONS

The present application is a continuation-in-part of U.S. patent application Ser. No. 14/728,014, filed Jun. 2, 2015, which the benefit of U.S. Provisional Patent Application No. 62/025,205, filed Jul. 16, 2014, both of which are incorporated herein by reference. The present application also claims the benefit of U.S. Provisional Application No. 62/085,746, filed Dec. 1, 2014, which is incorporated by reference herein. The present application also claims the benefit of International Patent Application PCT/US2015/033883, filed Jun. 3, 2015, which is incorporated by reference herein.

BACKGROUND OF THE INVENTION

The subject matter disclosed herein relates to a machining center and in particular to a machining center having an integrated noncontact measurement device and a photogrammetry system that registers the three-dimensional (3D) measurements into a common frame of reference.

A computer controlled machining center, such as a computational numerical control (CNC) machining center is used to produce complex components. The CNC machining centers can perform 5 and 6 axis operations at very high speeds. These systems typically have an automatic tool changing system that allows the machining center to retrieve a specific tool for each operation without stoppage or intervention from the operator.

While CNC machining centers have improved the ability to accurately cut and form components, the produced parts still need to be inspected to ensure the components are fabricated according to specification. Historically, the components or a sample group of components were transported to an inspection room where highly skilled inspection operators used measurement devices to determine the dimensions of the component. As metrology devices have improved and new devices such as articulated arm coordinate measurement devices developed, the location of the inspection has moved from the specialized inspection room to locations adjacent the machining center.

While moving the location of the inspection adjacent the machining center has reduced time and lowered costs, the inspection process still typically requires the machining center to stop operations while the operator performs the inspection. Commonly, the work piece is removed from the machining center when the inspection is performed. Thus the inspection still slows the time to produce components and utilizes additional operator time.

Accordingly, while existing CNC machining centers are suitable for their intended purpose the need for improvement remains, particularly in providing a CNC machining center which reduces the time and cost to perform inspections of a work piece.

BRIEF DESCRIPTION OF THE INVENTION

According to one aspect of the invention, a computer numerical control (CNC) machining center includes: a spindle configured to receive a cutting tool having a tool mount; a work surface operably arranged adjacent the spindle; a non-contact three-dimensional (3D) measurement device operably coupled to the machining center, the 3D measurement device including a projector having a light source and at least one device camera arranged in a fixed geometric relationship, the at least one camera being arranged to receive light from the light source that is reflected off of a surface; a plurality of targets, at least one of the targets being coupled to the non-contract 3D measurement device; at least two photogrammetry cameras having a predetermined orientation and a field of view to acquire images of the plurality of targets; and a controller coupled for communication to the non-contact 3D measurement device and the at least two photogrammetry cameras, the controller having a processor that is responsive to executable computer instructions for determining the position of the non-contact 3D measurement device within the machining center during operation.

According to another aspect of the invention, a method of machining a workpiece in a CNC machining center includes: coupling a cutting tool to a spindle, the cutting tool having a tool mount; engaging the cutting tool to the workpiece to form a feature; moving a non-contact three-dimensional (3D) scanner over the workpiece, the 3D scanner operably coupled to the machining center; in a first instance: determining with the 3D scanner first workpiece 3D coordinates of first workpiece points on the workpiece, the first workpiece 3D coordinates being in a scanner frame of reference tied to the 3D scanner, the 3D scanner including a projector, a scanner camera, and a target in a fixed geometric relationship, there being a scanner baseline distance between the projector and the scanner camera, the determining based at least in part on a pattern of emitted light sent from the projector onto the workpiece, on an first scanner image of the pattern of emitted light on the workpiece, and on the scanner baseline distance; determining in a system frame of reference first target 3D coordinates of the target with a first photogrammetry camera and a second photogrammetry camera, there being a photogrammetry baseline distance between the first photogrammetry camera and the second photogrammetry camera, the determining based at least in part on a first image of the first photogrammetry camera, a second image of the second photogrammetry camera, and the photogrammetry baseline distance; in a second instance: determining with the 3D scanner second workpiece 3D coordinates of second workpiece points on the workpiece, the second workpiece 3D coordinates being in the scanner frame of reference, the determining based at least in part on the pattern of emitted light sent from the projector onto the workpiece, on a second scanner image of the pattern of emitted light on the workpiece, and on the scanner baseline distance; determining in the system frame of reference second target 3D coordinates of the target with the first photogrammetry camera and the second photogrammetry camera, the determining based at least in part on a third image of the first photogrammetry camera, a fourth image of the second photogrammetry camera, and the photogrammetry baseline distance; and determining 3D coordinates of the first workpiece points and the second workpiece points in the system frame of reference based at least in part on the first workpiece 3D coordinates, the second workpiece 3D coordinates, the first target 3D coordinates, and the second target 3D coordinates.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the present invention provide advantages in allowing for the inspection of work pieces being machined within a CNC machining center without having to remove the work piece. Embodiments of the present invention provide advantages in allowing the inspection of the work piece in an automated manner without interruption by the machine operator. Still further embodiments of the invention provide a noncontact measurement device that may be stored and removed from the machining center tool magazine during operation. Still further embodiments of the invention provide advantages in automating the registration of three-dimensional (3D) measurements using photogrammetry techniques.

Figure 1:
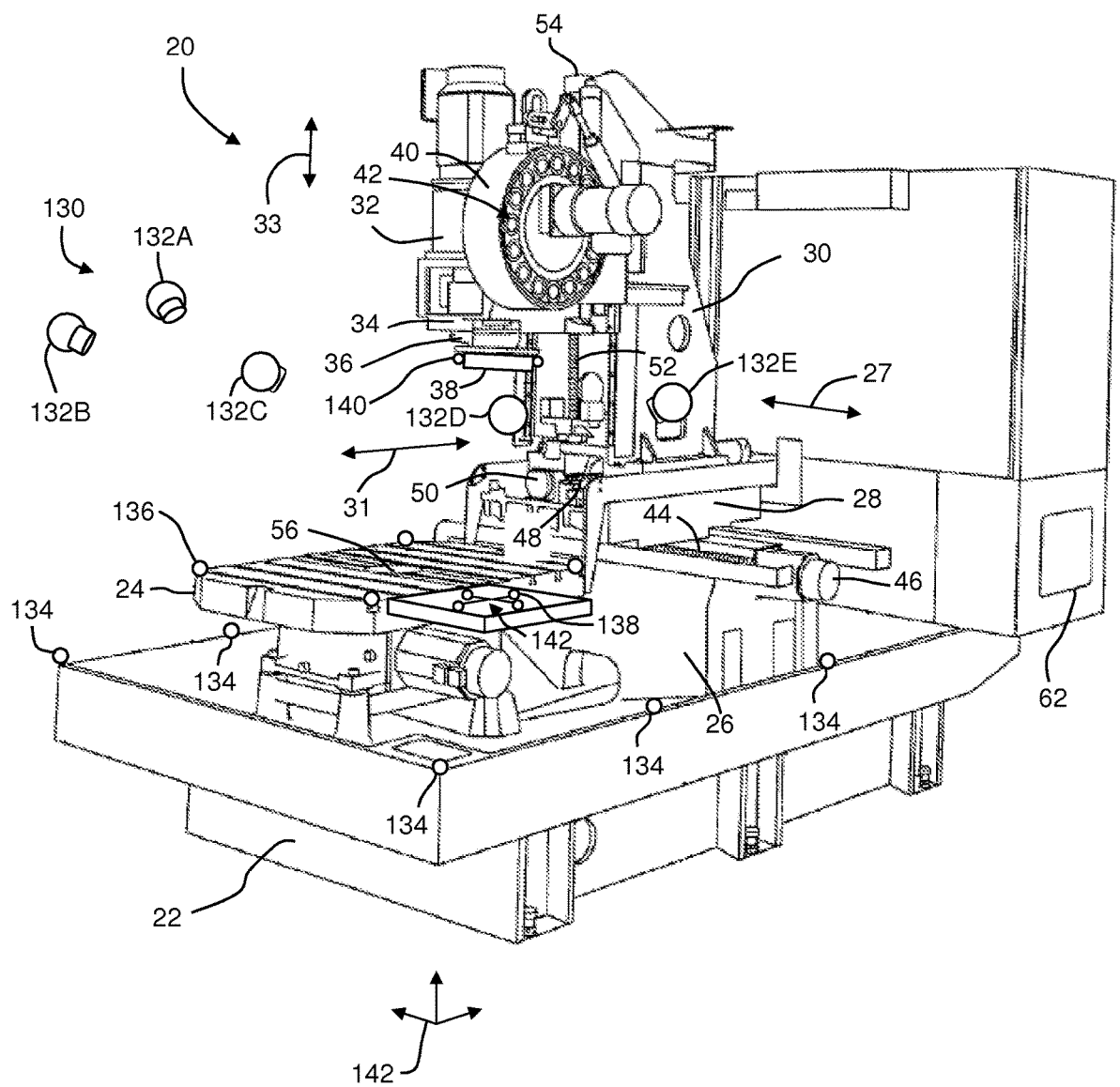
FIG. 1 is a perspective view of a machining center in accordance with an embodiment of the invention.
Figure 2:
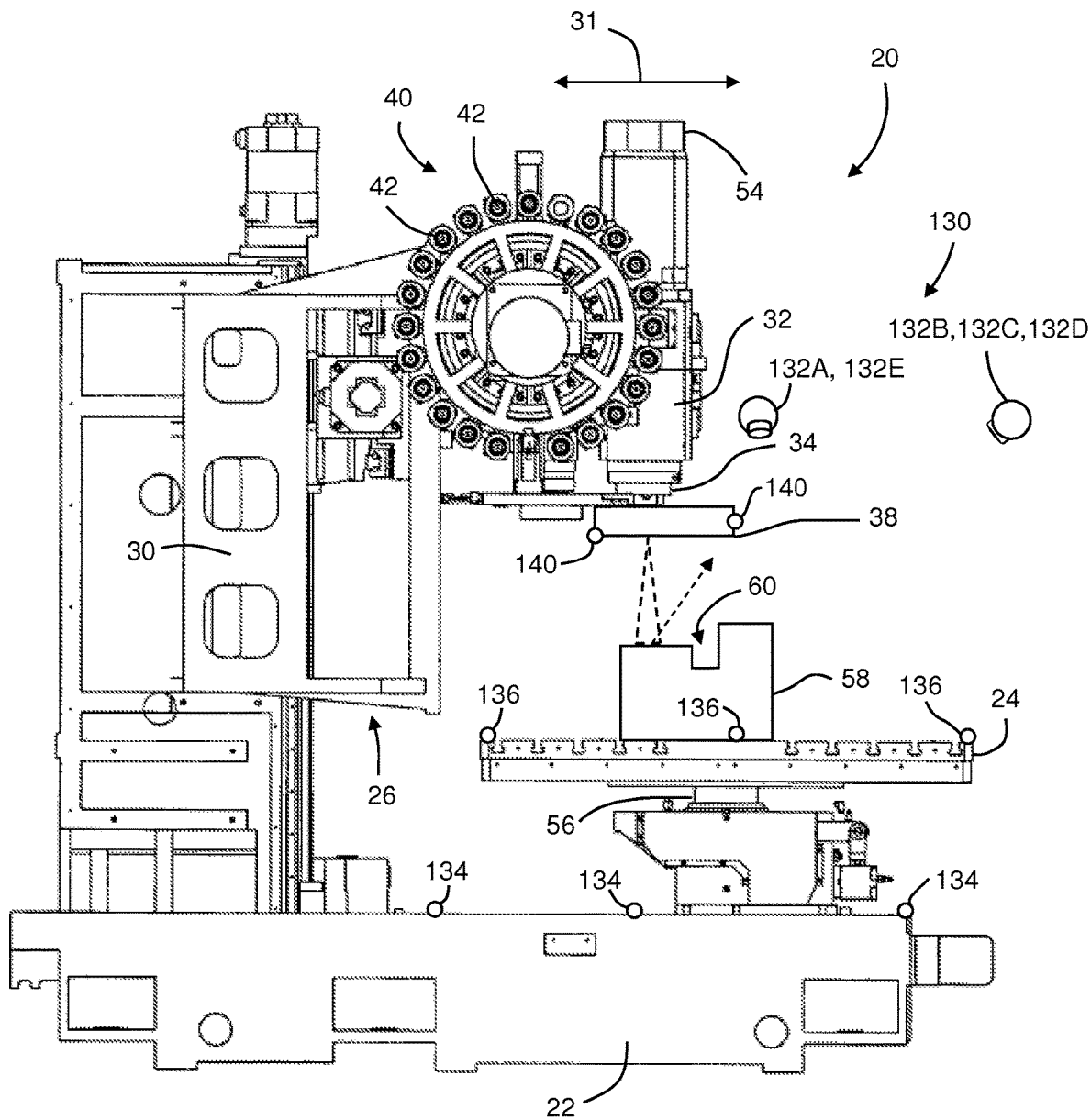
FIG. 2 is a side view of the machining center of FIG. 1 with a measurement device coupled to the machine head.
Figure 3:
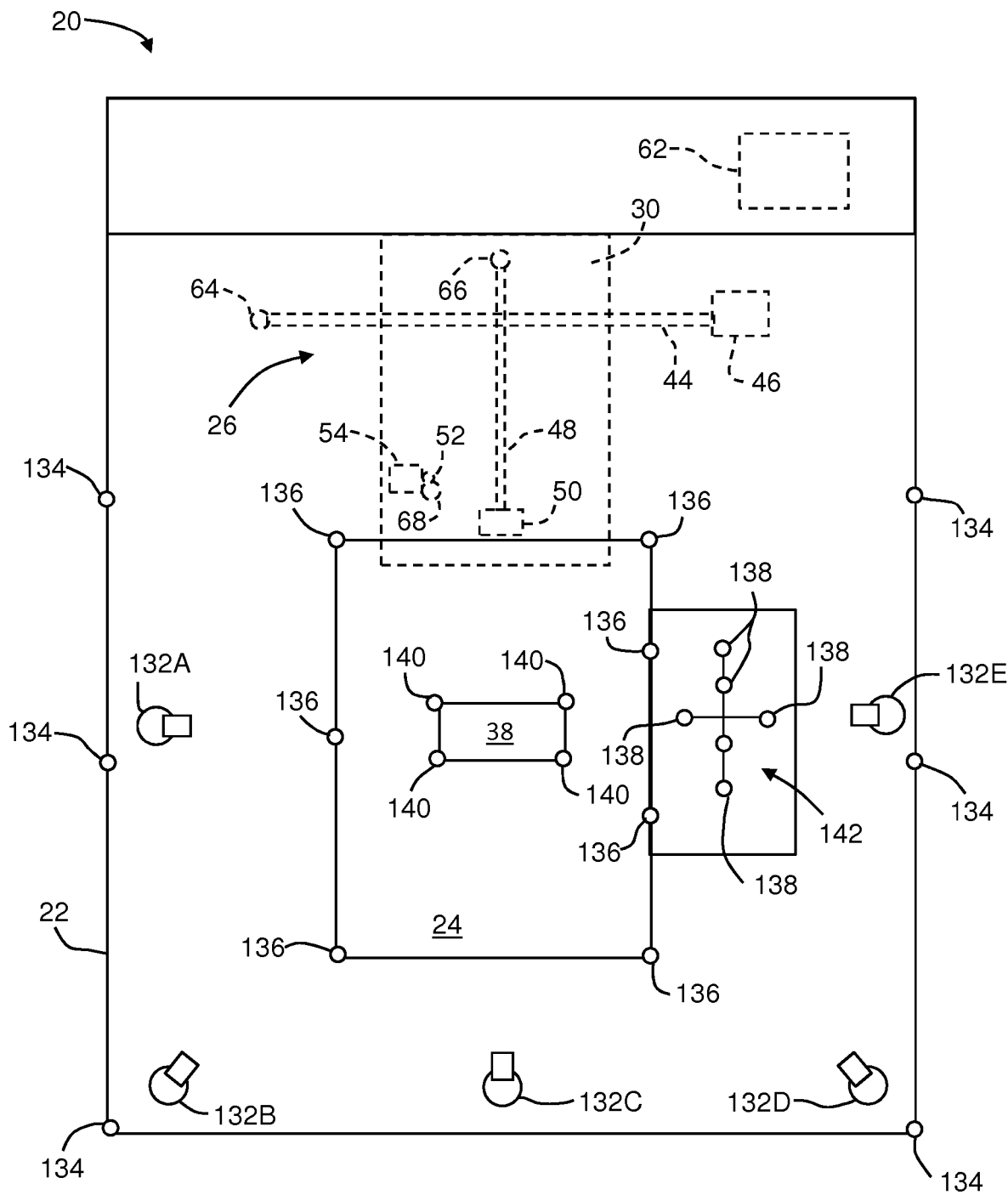
FIG. 3 is a top schematic diagram of the machining center of FIG. 1.

Referring now to FIGS. 1-3, a CNC machining center 20 is shown in accordance with an embodiment of the invention. The machining center 20 includes a base 22 with a rotatable work table 24 located on one end of the base 22. A sliding rail unit 26 is disposed on an opposite end of the base 22. A sliding seat 28 is movably mounted to the sliding rail unit 26 to move in a first horizontal direction 27. A post 30 is mounted to the sliding seat 28 and is movable in a second horizontal direction 31 that is substantially perpendicular to the first horizontal direction. It should be appreciated that the first and second horizontal directions define the X and Y axis of movement for the machining center 20. The post 30 extends in a direction substantially perpendicular to the plane defined by the first and second horizontal directions.

A spindle seat 32 is movably mounted to the post 30 and movable in a direction 33 substantially perpendicular to the plane formed by the first and second horizontal directions to define the Z-axis of the machining center. A spindle 34 with a tool mount 36 is coupled to the spindle seat 32. As will be discussed in more detail herein, the tool mount 36 is configured to receive a tool (not shown) or a noncontact measurement device 38 during operation. In the exemplary embodiment, the machining center 20 includes a tool magazine 40 arranged to receive and store tools and noncontact measurement device 38. The tool magazine 40 includes a plurality of holders 42 that are similarly configured to receive the shank of a tool or noncontact measurement device 38. The tools and noncontact measurement device 38 may be transferred between the tool magazine 40 and the tool mount 36 automatically during operation as is known in the art, such as with a tool changing arm for example.

It should be appreciated what while the tool magazine 40 is illustrated with the holders 42 extending perpendicular to the Z-axis about the circumference of the tool magazine 40, this is for exemplary purposes and other tool magazine and holder configurations are possible. For example, the tool magazine 40 may have holders 42 that extend radially from the outer diameter/periphery of the tool magazine 40. In another embodiment, the holders 42 may be oriented in a direction parallel to the Z-axis. In another embodiment, the tool magazine 40 may include a conveyor type system that follows a serpentine path. Further, while the tool magazine 40 is illustrated as being mounted directly adjacent the spindle 34, in other embodiments, the tool magazine 40 may be remotely mounted from the spindle. Further, the tool magazine 40 may be remotely located in an enclosure that may be selectively isolated (e.g. with a movable door) to shield the tool magazine 40 and the tools stored therein from debris, cooling fluid and lubricants used during the machining process.

The sliding seat 28 is driven along first horizontal direction 27 by a threaded rod 44 that is rotated by a servo motor 46. Similarly, the post 30 is driven in the second horizontal direction 31 by a threaded rod 48, which is rotated by a servo motor 50. The spindle seat 32 is moved along the Z-axis 33 by a threaded rod 52, which is rotated by a servo motor 54. It should be appreciated that while embodiments herein describe a threaded rod and servo motor arrangement, this is for exemplary purposes and the claimed invention should not be so limited. In other embodiments, other devices such as hydraulic or linear actuators may be used. Further, the machining center 20 may include encoders 64, 66, 68 (FIG. 3) associated with the threaded rods 44, 48, 52 to allow the position of the post 30 (and therefore a cutting tool in the spindle 34) to be determined in a local orthogonal coordinate system. Further, in some embodiments, the work table 24 may be mounted to rails and movable in multiple directions relative to the spindle seat 32. The work table 24 may also be mounted to a vertical shaft 56 that allows rotation of the work table 24 relative to the base 22.

The machining center 20 may further include a controller 62. The controller 62 may be described in the general context of computer system-executable instructions, such as program modules that may include routines, programs, objects, components, logic, data structures and so on that perform particular tasks or implement particular abstract data types. The controller 62 may be a local client of a distributed cloud computing environment where some tasks are performed by remote processing devices that are linked through a communications network. In a distributed computing environment, program modules may be located in both local and remote computer system storage media including memory storage devices.

The controller 62 may be in the form of a general-purpose computing device, also referred to as a processing device. The components of the controller may include, but are not limited to, one or more processors or processing units, a system memory, and a bus that couples the various system components including system memory to the processor. System memory can include computer system readable media in the form of volatile memory, such as random access memory (RAM and/or cache memory. The controller 62 may further include removable/non-removable volatile/non-volatile storage media, such as but not limited to magnetic media or optical media for example.

A program/utility, having a set of program modules, may be stored in memory by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions or methodologies of embodiments of the invention described herein.

The controller 62 may also communicate with one or more devices, such as a keyboard, a pointing device, a display, etc.; one or more devices that enable a user to interact with controller 62; or any devices (e.g. a communications circuit, network card, etc.). Such communication may occur via Input/Output (I/O) interfaces. Controller 62 may further communicate via one or more networks, such as a local area network (LAN), a general wide-area network (WAN), or a public network (e.g. the Internet) via a communications circuit. The communications may be via a wired communications medium (e.g. Ethernet, USB, etc.) or a wireless communications medium. The wireless communications medium may include IEEE 802.11 (WiFi), a Bluetooth® (IEEE 802.15.1 and its successors), RFID, near field communications (NFC), or cellular (including LTE, GSM, EDGE, UMTS, HSPA and 3GPP cellular network technologies) for example. It should be appreciated that the controller 62 is further configured to communicate with a communications circuit 68 in 3D measurement device 38.

It should be appreciated that while embodiments herein describe a three-axis machining center, this is for exemplary purposes and the claimed invention should not be so limited. In other embodiments, the machining center 20 may have more or fewer axes. Further, the machining center may be a vertical machining center, a horizontal machining center, a CNC milling machine, a CNC lathe, a CNC grinding machine or a CNC gear cutting machine for example. Further, the machining center may be other types of material-forming equipment, such as a spin forming center or a metal casting center for example. In still other embodiments, the machining center may be a plastic molding device, such as an injection molding or blowing machines for example. In still further embodiments, the machining center may be a composite material forming system that automates or semi-automates the layup or coating of composite laminations, the application of resins, or a resin transfer mold for example.

In the exemplary embodiment, the machining center 20 further includes a photogrammetry system 130 shown in FIGS. 1-3. The photogrammetry system 130 includes a plurality of cameras 132A-132E that are disposed about the periphery of the machining center 20. The cameras 132A-132E may include a digital photosensitive array that acquires an image of an operating area within the machining center that is within the respective camera field of view. In one embodiment, the plurality of cameras includes two cameras. The cameras 132A-132E may be coupled to communicate with a controller, such as controller 62 for example.

The photogrammetry system 130 further includes a plurality of targets 134, 136, 138, 140. The targets may include targets 134 disposed on the base 22 and targets 136 disposed on the work table 24. The targets 138 are coupled with a reference element 142. As will be discussed in more detail below, the reference element 142 is structure, such as a scale bar for example, that is visible to the cameras 132 and is of a predetermined size and shape. As will be discussed in more detail herein, the reference element 142 allows the photogrammetry system 130 to scale the images to determine 3D coordinates. In one embodiment, the reference element 142 is an object that is visible due to its structural features. In another embodiment, the reference element 142 is formed by a plurality of light-emitting or reflective targets that define the reference element. Finally, the photogrammetry system 130 may include movable targets 140 that are coupled to the measurement device 38. It should be appreciated that additional movable targets 140 may also be coupled to other portions of the post 30 or spindle seat 32 to allow the position of the post 30 and spindle seat 32 to be determined independently of the machining center 20 encoders 64, 66, 68. It should be appreciated that this provides advantages in allowing for independent confirmation of tool position and accuracy of the machine center encoders 64, 66, 68.

In one embodiment, the targets 134, 136, 138, 140 are passive targets, such as a reflective white circle or sphere for example. The reflective white circle may be an adhesive backed label for example. In another embodiment, the targets 134, 136, 138, 140 are an active target, such as a light emitting object. The light emitting object may be a light emitting diode for example. In one embodiment, the light emitting object may emit light in a nonvisible wavelength, such as infrared wavelength for example.

In an embodiment, the targets 134, 136, 138, 140 or the reference element 142 may be disposed on a plurality of planes that are retractable into an enclosure or behind a shield when the photogrammetry system 130 is not in operation.

It should be appreciated that the cameras 132 include a photosensitive array that is configured to respond to the wavelength of light emitted by the targets 134, 136, 138, 140. Further, the cameras 132 may include a shield or shutter that protects the camera lens system from debris and lubrication fluids during machining operations.

The use of photogrammetry system 130 allows the transformation of 3D coordinates acquired by the noncontact measurement device 38 into a common frame of reference 142 for the machining center 20. By acquiring photographic images from at least two different locations, a line of sight can be developed between each of the cameras 132 and each of the targets 134, 136, 138, 140 that are within each of the cameras field of view. It should be appreciated that in addition to the field of view, each camera 132 will also have other characteristics, such as depth of focus and exposure settings (F-Stop) for example. The cameras 132 used in the machining center 20 are chosen to have the desired characteristics to allow the capture of images within the machining center that have the desired quality. In one embodiment, the cameras 132 are chosen to have a field of view and depth of focus to capture images within the entire operating area of the machining center 20. In another embodiment, one or more cameras 132 may have a narrower field of view or depth of focus to cover only a portion of the operating area of the machining center 20. For example, the side cameras 132A, 132E may have a depth of focus that ranges from the near-side of the base 22 (relative to the respective camera) to the distal edge of the work table 24. Further, in an embodiment using passive targets, the cameras 132 may include lights or flashes that illuminate the passive targets. These lights may be coupled to each of the cameras 132 or positioned separately therefrom.

Photogrammetry is a process that converts two-dimensional (2D) images into 3D coordinates using triangulation. By acquiring at least two images of a target, the position of the target relative to the cameras may be determined using triangulation principles. From each image, a line of sight or ray is defined between the camera and the target. Where the lines of sight intersect, the location of the target may be determined. Where the target is located in more than two images, a best-fit method may be used to determine the intersection point. It should be appreciated that while the location may be determined, absent additional information, the location is dimensionless. In one embodiment, the reference element 142 is of a known size and shape. By arranging the cameras 132 to capture the reference element 142 in addition to the target, the 3D coordinates of the target may be determined.

In order for the triangulation analysis to determine the 3D coordinates of each target, the location and aiming angle (collectively referred to as "orientation") of each camera 132 needs to be known. In one embodiment, the orientation of the cameras 132 is determined using a procedure referred to as "resection." In the resection process, a number of target points having a known position are imaged. In one embodiment, this may be performed with a plate having the target points formed thereon. For example, the target plate may have between a dozen and several hundred targets, including targets of different size, distributed across the plate. The target plate may then be placed on the work table 24 and images taken. Since the orthogonal x, y and z coordinates of the points is known, the orientation of each camera may be determined.

In one embodiment, the photogrammetry system 130 uses a "bundle adjustment" process to determine the camera orientation, the target coordinates and also perform a camera calibration simultaneously. The bundle adjustment simply uses a preliminary orientation of each camera and then the camera orientation and the target coordinates may be automatically determined. In one embodiment, this compensation process is performed at least once for each machining center 20. The compensation process may be periodically performed to account for changes in the environment, such as changes in the distances between the cameras, angles of the cameras or a scale factor for example.

Figure 4:
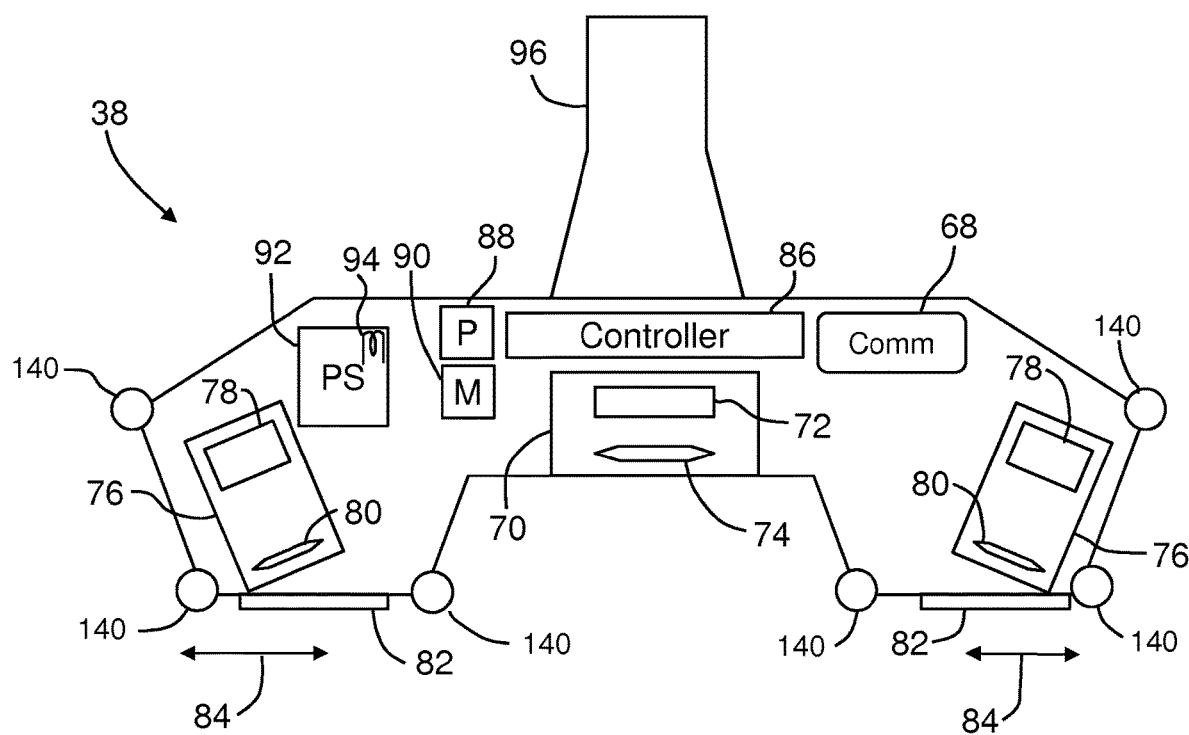
FIG. 4 is a schematic diagram of the measuring device of FIG. 2.

Referring now to FIG. 4, an embodiment is shown of 3D measurement device 38. In the exemplary embodiment, the 3D measurement device 38 is an optical measurement device that uses light, such as a LED (incoherent) or laser (coherent) light. The light might be a line of light or an area of light (structured light) for example. In an embodiment, the 3D measurement device 38 includes a projector 70 having a light source 72 and a lens system 74. Arranged in a fixed geometric relationship with the projector 70 is at least one camera 76 arranged to receive light emitted from the projector 70 and reflected off of the work piece 58. Each camera 76 includes a photosensitive array 78 and a lens 80. In some embodiments, a shutter 82 is disposed over each lens system 80 to prevent fluids and debris from the machining operation from contacting the lens system 80, such as when the 3D measurement device 38 is stored in the tool magazine 40. The shutter 82 moves in the direction indicated by the arrow 84 between an open and closed position. In one embodiment, the shutter 82 is in the closed position when the 3D measurement device 38 is in the tool magazine 40 and in the open position when the 3D measurement device 38 in mounted to the spindle and energized.

The 3D measurement device 38 also includes a controller 86 that may be a digital circuit, the controller having a microprocessor 88 that includes memory 90, for example, or an analog circuit. The controller 86 is electrically coupled to the projector 70 and cameras 76 to provide operational control during operation. In one embodiment, the controller 86 is in asynchronous bidirectional communication with the controller 62 (FIG. 1). The communication connection between the controller 86 and the controller 62 may be via a direct or indirect wireless connection (e.g. Bluetooth or IEEE 802.11). A power supply 92 provides electrical power to the controller 86, the projector 70 and cameras 76. In one embodiment, the power supply 92 is an induction power supply having a secondary coil circuit 94 that is configured to generate electrical power for the 3D measurement device 38 in response to a magnetic field generated by an external primary coil.

The 3D measurement device 38 further includes a tool mount 96. The tool mount 96 is sized and shaped to be received in both the holders 42 of tool magazine 40 and the spindle 34 (FIG. 1). The tool mount 96 may further have one or more features that allow the machining center to transfer in an automated manner the 3D measurement device 38 between the tool magazine 40 and the spindle 34.

Figure 5:
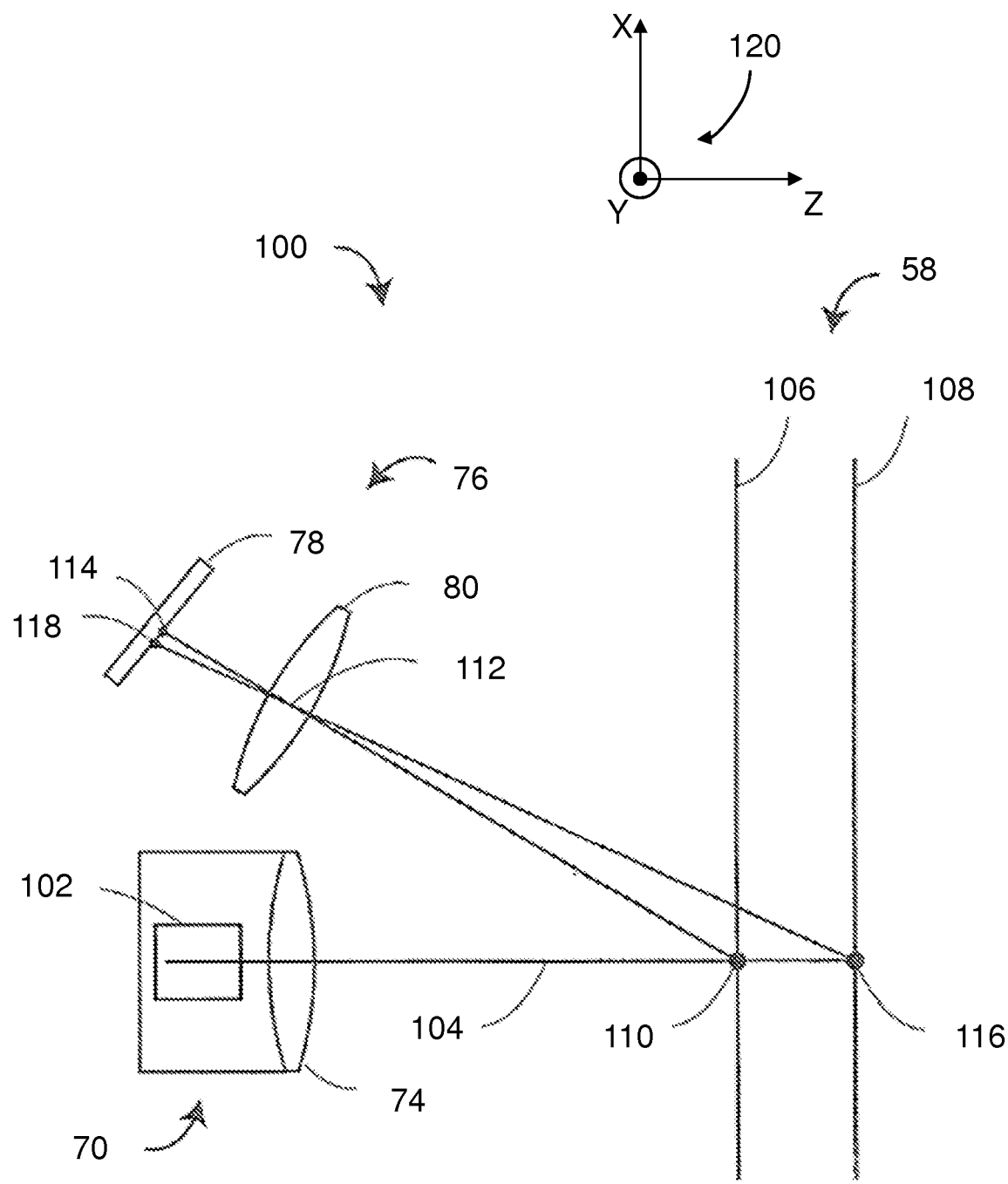
FIG. 5 is a schematic diagram of a laser line probe measuring device.
Figure 6:
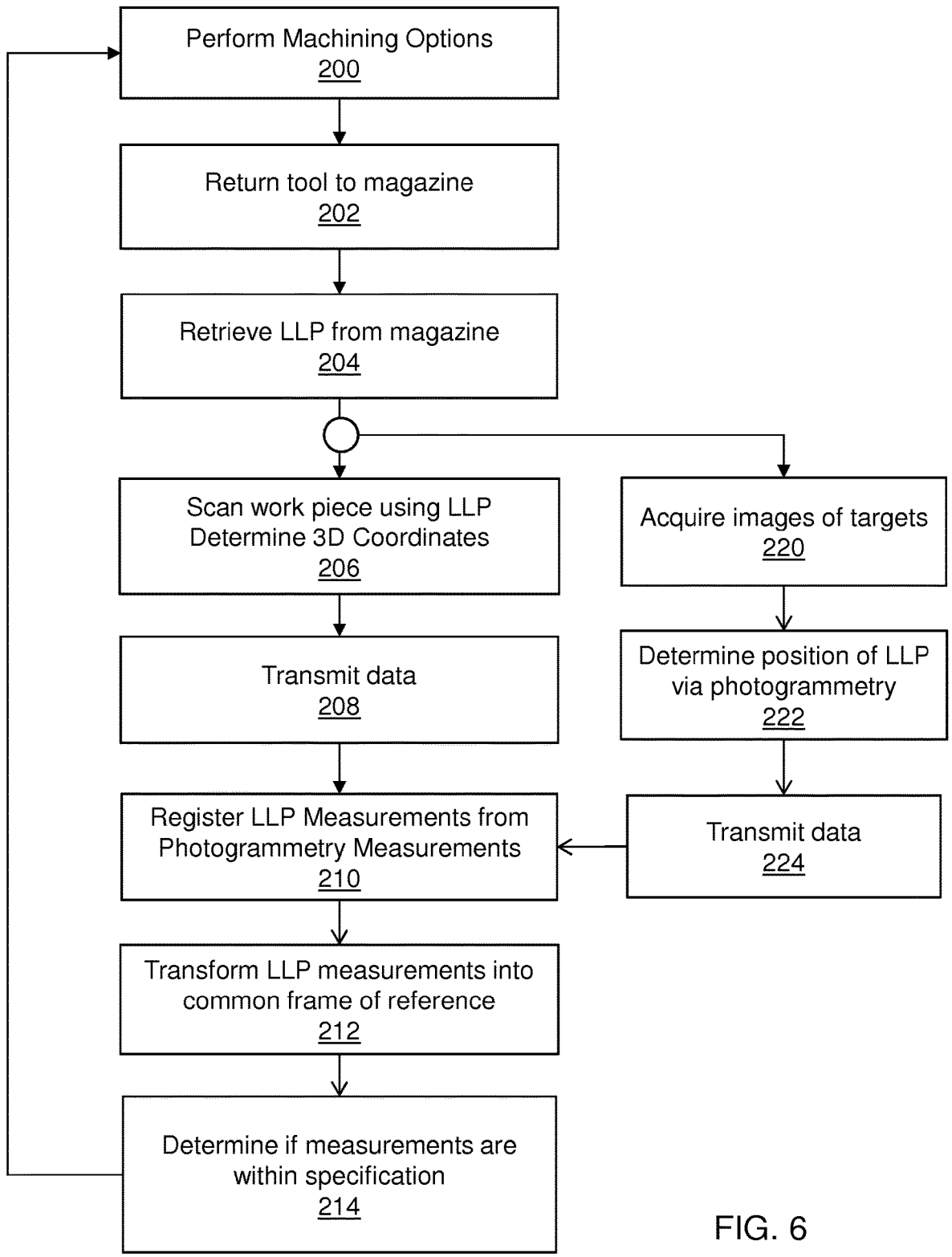
FIG. 6 is a flow diagram of a method of measuring a work piece within a machining center.

In one embodiment, the 3D measurement device 38 is a laser line probe (LLP), also referred to as a line scanner. The principle of operation of a line scanner is shown schematically in FIG. 5. A top view of a line scanner 100 includes a projector 70 and a camera 76, the camera including a lens system 80 and a photosensitive array 78 and the projector including an objective lens system 74 and a pattern generator 102. The pattern generator 102 may include a low-coherence light source 72 (FIG. 4) and a beam delivery system. The projector 70 projects a line 104 (shown in the figure as projecting out of the plane of the paper) onto the surface of work piece 58, which may be placed at a first position 106 or a second position 108. Light scattered from the work piece at the first point 110 travels through a perspective center 112 of the lens system 80 to arrive at the photosensitive array 78 at position 114. Light scattered from the work piece at the second position 116 travels through the perspective center 112 to arrive at position 118. By knowing the relative positions and orientations of the projector 70, the camera lens system 80, the photosensitive array 78, and the position 114 on the photosensitive array, it is possible to calculate the three-dimensional coordinates of the point 110 on the work piece surface. Similarly, knowledge of the relative position of the point 118 rather than point 114 will yield the three-dimensional coordinates of the point 116. The photosensitive array 78 may be tilted at an angle to satisfy the Scheimpflug principle, thereby helping to keep the line of light on the work piece surface in focus on the array.

One of the calculations described herein above yields information about the distance of the object from the line scanner—in other words, the distance in the z direction, as indicated by the local frame of reference 120. The information about the x position and y position of each point 110 or 116 relative to the line scanner in the local frame of reference 120 is obtained by the other dimension of the photosensitive array 78, in other words, the y dimension of the photosensitive array. As will be discussed in more detail below, the plane that defines the line of light as it propagates from the projector 70 to the object may be determined from the photogrammetry system 130, it follows that the x position of the point 110 or 116 on the work piece surface is also known. Hence all three coordinates—x, y, and z—of a point on the object surface can be found from the pattern of light on the two-dimensional photosensitive array 78.

It should be appreciated that the LLP 100 may include a second camera 76 arranged on a side of the projector 70 opposite the other camera 76. Both cameras 76 view the same projected light but from different angles. This provides advantages in allowing an area not visible to one of the cameras to be imaged by the camera on the opposite side, and vice versa.

Referring now to FIGS. 1-3 and 6, the operation of the machining center 20 will be described. In the exemplary embodiment, a work piece 58 is clamped to the work table 24 as is known in the art. The work piece 58 may include one or more features 60 that are formed in the work piece 58 by a tool (not shown) in step 200. The tools are mounted to the spindle 34 of the machining center 20 to form the features 60. Once the features 60 are formed, it is desirable to measure the features 60 to ensure they are within the desired specifications. In the exemplary embodiment, the tool magazine 40 includes at least one noncontact 3D measurement device 38. The 3D measurement device 38 may be a laser line probe, a structured light scanner, or a combination thereof for example. To measure the features 60, the machining center 20 returns the tool used to form the features 60 to the tool magazine 40 in step 202 and retrieves the 3D measurement device 38 from storage in step 204. As discussed above the holders 42 are configured to release the 3D measurement device 38 to allow the device to be transferred from storage in the tool magazine 40 to the spindle 34.

In another embodiment, the 3D measurement device 38 may be coupled to the spindle seat 32 or post 30 separate from the spindle 34. In this embodiment, 3D measurement device 38 is not retrieved from storage and measurements may be made directly while the tool used to form features 60 is still within the spindle 34.

With the 3D measurement device 38 mounted in the spindle 34, the spindle seat 32 is moved, such as by actuation of the servo motors 46, 50, 54 in the directions 27, 31, 33. The 3D measurement device 38 may then be moved adjacent the features 60 and the desired measurements acquired in step 206. These acquired measurements may be then by transmitted to the controller 62 via a communications medium in step 208. The 3D measurement device is returned to the tool magazine in step 210.

While the 3D measurement device is acquiring measurements of features 60, the photogrammetry system 30 monitors the position of the 3D measurement device in block 220 by recording two-dimensional (2D) images of the targets 140 with the cameras 132. In one embodiment, images of the targets 134, 136 are also captured by the photogrammetry system 30 simultaneously with the targets 140 which allows the determination of the 3D coordinates of the of the periphery of the base 22 and the table 24. Since these structures are fixed relative to the machining center 20, a common photogrammetric frame of reference may be established. In this way, the location of the 3D measurement device may be determined in the common photogrammetric frame of reference. This determination of the 3D coordinates of the measurement device is independent of the machining center encoders 64, 66, 68 that determine the position of the post 30. Thus, one advantage of embodiments disclosed herein is the independent verification of the accuracy of the machining center 20.

With the images of the targets acquired, the process proceeds to determine the 3D coordinates of the targets 140 in step 222. It should be appreciated that since the geometric arrangement of the 3D measurement device 38 is known, the locations of the targets 140 may be translated to determine the position of the 3D measurement device's sensor, such as the photosensitive array 78 for example. This position data is then transmitted in step 224, such as to controller 62 for example.

The process then proceeds to step 210 where the LLP measurements are registered in the common photogrammetric frame of reference in step 212 based on the 3D measurement device 38 position data determined by the photogrammetry system 130. In one embodiment, both the data from 3D measurement device 38 and the photogrammetry system 130 include time data for when the respective LLP image and camera 132 images were acquired. In this way, the two data sets may be mapped or registered to each other to correlate the position of the 3D measurement device 38 within the machining center 20 with the measurements acquired by the 3D measurement device 38. This allows the 3D coordinates acquired by the 3D measurement device 38 to be transformed into a common photogrammetric frame of reference in block 212. It should be appreciated that this registration is performed without having to use position data from the encoders 64, 66, 68 that measure the movement of the post 30.

The acquired measurements may be compared with predetermined values and determine if the formed features 60 are within a predetermined specification in step 214. In one embodiment, one or more temperature sensors may be used to compensate the measurements to account for dimensional changes based on the thermal coefficient of expansion. Thus, the machining center 20 is able to automatically form a feature 60 and perform an inspection of the dimensions without intervention from the operator and independently of the encoders 64, 66, 68 that measure the movement of the post 30. It should be appreciated that if the dimensions are out of specification, the machining center 20 may alert the operator, or automatically take other corrective action (e.g. perform further machining operation).

In another embodiment, the 3D measuring device 38 is a structured light scanner rather than an LLP. The structured light scanner projects light over an area rather than over a line. The structured light scanner may be a type that projects multiple sequential images while placed at a fixed position. For example, the structured light scanner may project three or more patterns of light in a sinusoidal spatial pattern, with each pattern shifted in phase (shifted to the side) relative to the previously projected sinusoidal patterns. A processor determines the distance to the object based at least in part on the measured phase at each point in the sequential patterns as well as on a triangulation calculation, the triangulation calculation based at least in part on the baseline distance between perspective centers of the camera 70 and the perspective center(s) of the one or more cameras 76.

Another type of structured light scanner obtains 3D coordinates of a surface of the work piece 58 based on a single image sent from a projector 70 onto the surface and captured by the camera 76. Use of a single projected and captured image is possible if a way is provided for determining a correspondence between the projected and imaged points. This may be done, for example, by providing projected pattern elements distinctly recognizable by the camera 76. With the correspondence established, the processor uses principles of triangulation to determine the 3D coordinates of surface points of the work piece 58. The 3D measuring device 38 may equally well scan a spot, project a line, or project a pattern over an area.

It should be appreciated that to determine the coordinates of the work piece 58 in the common frame of reference 142, two sets of coordinate calculations may be performed. The first is performed by the 3D measurement device 38 and the second by the photogrammetry system 30 to register the plurality of 3D scans together. Each coordinate determination uses a triangulation to obtain the desired result. In the instance of the 3D measurement device, the determination of the work piece 58 coordinates is based at least in part on the projected light (e.g. either a line or structured light) that is emitted by a projector onto the object and an image of the projected light that is reflected off of the object is received by a photosensitive array in the camera. The coordinates are also at least partially based on a baseline distance between the perspective centers of the projector and camera. In the case of the photogrammetry system 30, two photogrammetry cameras acquire or capture images of a common collection of photogrammetry targets. The common collection of photogrammetry targets include at least one photogrammetry target located on the 3D measurement device 38 and at least one photogrammetry target located on a stationary (e.g. unmoving) background member (e.g. base 22 or work table 24). The photogrammetry controller determines the coordinates of the 3D measurement device in the common reference frame based at least in part on the images of the common collection of photogrammetry targets and by a baseline distance between the perspective centers of the photogrammetry cameras.

As discussed, the measurements of the work piece 58 may be determined independent of the encoders 64, 66, 68 that move the post 30. This also allows for the determination of the accuracy of the machining center 20. In one embodiment, a probe having a target 140 mounted thereon is coupled to the spindle 34. The post 30 is then moved using the servo motors 46, 50, 54 in a predetermined manner. As the post 30 is moved, the position of the target 40 on the probe is determined using the photogrammetry system 130. Once the movements are completed, the position data from photogrammetry system 130 may then be mapped or registered with the encoder data and compared. The deviation of the encoder position data from that recorded by the photogrammetry system 130 will determine the level of accuracy of the machining center 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A computer numerical control (CNC) machining center comprising:
    a spindle configured to receive a cutting tool having a tool mount;
    a tool magazine for receiving the tool mount of the cutting tool and storing the cutting tool;
    a work surface operably arranged adjacent the spindle;
    a non-contact three-dimensional (3D) measurement device operably coupled to the machining center, the 3D measurement device including a projector having a light source and at least one device camera arranged in a fixed geometric relationship, the at least one camera being arranged to receive light from the light source that is reflected off of a surface, and a measurement device tool mount configured to enable storage of the non-contact three-dimensional (3D) measurement device in the tool magazine;
    a plurality of targets, at least one of the targets being coupled to the non-contact 3D measurement device, wherein each of the plurality of targets is disposed on a plane that is retractable into an enclosure or behind a shield;
    at least two photogrammetry cameras having a predetermined orientation and a field of view to acquire images of the plurality of targets; and
    a controller coupled for communication to the non-contact 3D measurement device and the at least two photogrammetry cameras, the controller having a processor that is responsive to executable computer instructions for determining the position of the non-contact 3D measurement device within the machining center.

2. The CNC machining center of claim 1 wherein the determination of the position of the non-contact 3D measurement device is determined by photogrammetry of images that include the at least one target coupled to the non-contact 3D measurement device and at least one target coupled to a stationary member.

3. The CNC machining center of claim 2 wherein the position of the non-contact 3D measurement device within the machining center is further based at least in part on a baseline distance between a perspective centers of the at least two photogrammetry cameras.

4. The CNC machining center of claim 3 wherein the non-contact 3D measurement device is configured to determine three dimensional coordinates of a work piece on the work surface in a local frame of reference based at least in part on an image of the light reflected off of a surface and a baseline distance between a perspective centers of the projector and at least one camera.

5. The CNC machining center of claim 4 wherein the controller is further configured to correlate three-dimensional coordinates of the work piece in a common frame of reference based at least in part on the three-dimensional coordinates in the local frame of reference and the determined position of the non-contact 3D measurement device during operation.

6. The CNC machining center of claim 5 wherein:
    the projector further includes a first lens system, the light source configured to emit light, the first lens system configured to receive the light and to spread out the light into a first line of light;
    the device camera includes a second lens system and a photosensitive array, the device camera having predetermined characteristics including a focal length of the second lens system and a position of the photosensitive array relative to the second lens system to define a geometrical configuration, and wherein the second lens system is configured to collect the light reflected by or scattered off a work piece as a first collected light and image the first collected light onto the photosensitive array, the photosensitive array configured to convert the collected light into an electrical signal; and
    an electronic circuit including a processor, wherein the electronic circuit is configured to determine the three-dimensional coordinates of a plurality of points of light projected on the work piece by the projector, the three-dimensional coordinates based at least in part on the electrical signal, the device camera predetermined characteristics, and the geometrical configuration.

7. The CNC machining center of claim 5 wherein the plurality of targets comprise passive targets that reflect light.

8. The CNC machining center of claim 5 wherein the plurality of targets comprise active targets that emit light.

9. The CNC machining center of claim 8 wherein the active targets include light emitting diodes.

10. The CNC machining center of claim 5 wherein the plurality of targets comprises:
   a first plurality of targets disposed about a periphery of an operating area of the machining center;
   a second plurality of targets disposed on the work surface; and
   at least one target disposed on the non-contact 3D measurement device.

11. The CNC machining center of claim 1 further comprising a reference element, the reference element being arranged in the field of view of the at least two photogrammetry cameras.

12. The CNC machining center of claim 11 within the plurality of targets includes a plurality of reference targets disposed on the reference element.

13. The CNC machining center of claim 11 wherein the reference element is a scale bar having a predetermined length.

14. A method of machining a workpiece in a CNC machining center, the method comprising:
   coupling a cutting tool to a spindle, the cutting tool having a tool mount;
   engaging the cutting tool to the workpiece to form a feature;
   storing the cutting tool in a tool magazine by engaging the tool mount into the tool magazine;
   removing a non-contact three-dimensional (3D) scanner from the tool magazine by a measurement device tool mount;
   moving the non-contact three-dimensional (3D) scanner over the workpiece, the 3D scanner operably coupled to the machining center;
   in a first instance:
      determining with the 3D scanner first workpiece 3D coordinates of first workpiece points on the workpiece, the first workpiece 3D coordinates being in a scanner frame of reference tied to the 3D scanner, the 3D scanner including a projector, a scanner camera, and a target in a fixed geometric relationship, there being a scanner baseline distance between the projector and the scanner camera, the determining based at least in part on a pattern of emitted light sent from the projector onto the workpiece, on an first scanner image of the pattern of emitted light on the workpiece, and on the scanner baseline distance;
      determining in a system frame of reference first target 3D coordinates of the target with a first photogrammetry camera and a second photogrammetry camera, there being a photogrammetry baseline distance between the first photogrammetry camera and the second photogrammetry camera, the determining based at least in part on a first image of the first photogrammetry camera, a second image of the second photogrammetry camera, and the photogrammetry baseline distance;
   in a second instance:
      determining with the 3D scanner second workpiece 3D coordinates of second workpiece points on the workpiece, the second workpiece 3D coordinates being in the scanner frame of reference, the determining based at least in part on the pattern of emitted light sent from the projector onto the workpiece, on a second scanner image of the pattern of emitted light on the workpiece, and on the scanner baseline distance;
      determining in the system frame of reference second target 3D coordinates of the target with the first photogrammetry camera and the second photogrammetry camera, the determining based at least in part on a third image of the first photogrammetry camera, a fourth image of the second photogrammetry camera, and the photogrammetry baseline distance; and
      determining 3D coordinates of the first workpiece points and the second workpiece points in the system frame of reference based at least in part on the first workpiece 3D coordinates, the second workpiece 3D coordinates, the first target 3D coordinates, and the second target 3D coordinates; and
   retracting at least one of the first target and the second target into an enclosure or behind a shield when the CNC machining center is not in operation.

15. The method of claim 14, further comprising:
   providing a first plurality of machining center targets disposed on a periphery of the operating area of the machining center; and
   providing a second plurality of work piece targets disposed on the work surface.

16. The method of claim 14, wherein the first photogrammetry camera and the second photogrammetry camera further capture images of a reference element, the reference element having a predetermined length.

17. The method of claim 16, wherein determining 3D coordinates of the first workpiece points and the second workpiece points in the system frame of reference is further based on the captured images of the reference element.

18. The method of claim 14, wherein, in moving a non-contact three-dimensional (3D) scanner over the workpiece, the spindle attaches to the 3D scanner.

19. The method of claim 14, further comprising:
   storing the non-contact three-dimensional (3D) scanner in the tool magazine.

20. The CNC machining center of claim 11, wherein the reference element is disposed on a plane that is retractable into an enclosure or behind a shield.

* * * * *